(12) United States Patent
Lee et al.

(10) Patent No.: US 9,610,545 B2
(45) Date of Patent: Apr. 4, 2017

(54) HOLLOW-FIBRE MEMBRANE HAVING NOVEL STRUCTURE, AND PRODUCTION METHOD THEREFOR

(71) Applicant: LG ELECTRONICS INC., Seoul (KR)

(72) Inventors: Junseok Lee, Seoul (KR); Sumin Lee, Seoul (KR); Hyunhwan Oh, Seoul (KR); Changho Lee, Seoul (KR); Minjoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 14/418,708

(22) PCT Filed: Mar. 29, 2013

(86) PCT No.: PCT/KR2013/002612
§ 371 (c)(1),
(2) Date: Jan. 30, 2015

(87) PCT Pub. No.: WO2014/098322
PCT Pub. Date: Jun. 26, 2014

(65) Prior Publication Data
US 2015/0202576 A1    Jul. 23, 2015

(30) Foreign Application Priority Data
Dec. 21, 2012  (KR) ........................ 10-2012-0151027

(51) Int. Cl.
*B01D 33/21* (2006.01)
*B01D 39/00* (2006.01)
(Continued)

(52) U.S. Cl.
CPC ............. *B01D 69/08* (2013.01); *B01D 69/02* (2013.01); *B01D 69/087* (2013.01); *B01D 71/34* (2013.01);
(Continued)

(58) Field of Classification Search
CPC ...... B01D 69/02; B01D 53/228; B01D 69/08; B01D 63/02; B01D 2325/022; B01D 71/34
See application file for complete search history.

(56) References Cited

U.S. PATENT DOCUMENTS 4,489,406 A * 12/1984 Hsieh ..................... G11B 7/085
369/30.12
4,933,085 A * 6/1990 Kneifel .................. B01D 69/08
210/500.39
(Continued)

FOREIGN PATENT DOCUMENTS

| CN | 1669624 A | 9/2005 |
|----|-----------|--------|
| CN | 1680007 A | 10/2005 |

(Continued)

OTHER PUBLICATIONS

Chinese Office Action dated Oct. 28, 2015 issued in Application No. 201380042192.6 (with English translation).
(Continued)

*Primary Examiner* — Ana Fortuna
(74) *Attorney, Agent, or Firm* — KED & Associates, LLP

(57) ABSTRACT

The present invention relates to a hollow-fibre membrane having a novel structure and to a production method therefor. The hollow-fibre separation membrane of the present invention has an outermost shell surface pore size of between 0.001 and 0.05 μm and a mean pore size of between 0.01 and 0.1 μm while having, in sequence from the outermost shell surface, a dense sponge structure, a finger-like
(Continued)

sponge structure and a mixed sponge-bead structure; and, because of this specific triple structure, the invention has outstanding mechanical strength, porosity and water permeability alike while also having a high performance whereby it is possible to eliminate even viruses.

12 Claims, 17 Drawing Sheets

(51) Int. Cl.
*B01D 67/00* (2006.01)
*B01D 69/08* (2006.01)
*B01D 71/34* (2006.01)
*D01D 5/247* (2006.01)
*D01F 6/12* (2006.01)
*B01D 69/02* (2006.01)

(52) U.S. Cl.
CPC ............... *D01D 5/247* (2013.01); *D01F 6/12* (2013.01); *B01D 2323/08* (2013.01); *B01D 2325/02* (2013.01); *B01D 2325/026* (2013.01); *B01D 2325/30* (2013.01)

(56) References Cited

U.S. PATENT DOCUMENTS

| | | | |
|---|---|---|---|
| 4,935,141 A * | 6/1990 | Buck | B01D 67/0009 210/500.38 |
| 5,489,406 A | 2/1996 | Beck et al. | 264/41 |
| 8,523,981 B2 * | 9/2013 | Huang | B01D 69/08 264/209.7 |
| 2003/0015466 A1 * | 1/2003 | Ji | B01D 67/0011 210/500.25 |
| 2008/0210624 A1 * | 9/2008 | Li | B01D 67/0011 210/500.23 |
| 2011/0263020 A1 * | 10/2011 | Zweigart | A61L 27/26 435/396 |
| 2014/0319049 A1 * | 10/2014 | Tang | B01D 69/12 210/489 |
| 2015/0053610 A1 * | 2/2015 | Diallo | B01D 67/0079 210/500.23 |
| 2015/0266222 A1 * | 9/2015 | Lee | B01D 69/02 264/177.14 |

FOREIGN PATENT DOCUMENTS

| | | | |
|---|---|---|---|
| CN | 202136924 U | | 2/2012 |
| KR | 10-2001-0061733 A | | 7/2001 |
| KR | 10-2008-0045275 A | | 5/2008 |
| KR | 10-2011-0033729 A | | 3/2011 |
| KR | 20120001970 | * | 5/2012 |
| KR | 10-1179161 B1 | | 9/2012 |
| WO | 2015/056853 | * | 4/2015 |

OTHER PUBLICATIONS

International Search Report and Written Opinion dated Sep. 5, 2013 issued in Application No. PCT/KR2013/002612.

* cited by examiner

HOLLOW-FIBRE MEMBRANE HAVING NOVEL STRUCTURE, AND PRODUCTION METHOD THEREFOR

CROSS-REFERENCE TO RELATED PATENT APPLICATIONS

This application is a U.S National Stage Application under 35 U.S.C. §371 of PCT Application No. PCT/KR2013/002612, filed Mar. 29, 2013, which claims priority to Korean Patent Application No. 10-2012-0151027, filed Dec. 21, 2012, whose entire disclosures are hereby incorporated by reference.

TECHNICAL FIELD

The present invention relates to a hollow fiber membrane having a novel structure and a method of preparing the same.

BACKGROUND OF INVENTION

A separation membrane used to separate gas, liquid or solid, particularly a specific component such as an ion material is designed to have selectivity to the material to be removed by appropriately combining a dense structure or a porous structure for selectively permeating and removing the specific component, and simultaneously allow a permeable material to be permeated with low resistance.

Recently, a membrane separation technology using a separation membrane having such a structure has been frequently applied even to water purification and sewage and wastewater processes. The separation membrane for water treatment is classified into a polymer membrane, a ceramic membrane, and a metal membrane according to the material, and into microfiltration (MF), ultrafiltration (UF), nanofiltration (NF), and reverse osmosis (RO) membranes, and among them, the ultra-filtration membrane has a characteristic of allowing the ion material to be permeated, but removing low-molecular/polymer particles or bacteria and viruses, and may vary according to the reference, but usually has a pore size in a range from 0.01 to 0.1 μm. The ultra-filtration membrane having such characteristics has a wide application range such as pretreatment of process water or ultrapure water, reuse, sewage and wastewater treatment and water purification.

In general, a separation membrane used for water treatment generates contamination on the membrane surface while filtering contaminated raw water to adsorb and grow a contamination source on the membrane surface, and when the separation membrane is severely contaminated, water permeation pressure acting during the filtration is increased, and production quantity is gradually decreased, ultimately leading to reduction in filtration function of the separation membrane.

In order to control contamination of the separation membrane, water is purified using chlorine-based, and acid and alkali materials, but since this method has a problem of shortening the service life of the separation membrane, studies using a polyvinylidene fluoride-based resin which is a material having high chemical resistance have been recently conducted.

As a method of preparing a separation membrane using a polyvinylidene fluoride-based resin as a material, there has been generally used a non-solvent induced phase separation method in which a porous structure is formed by performing casting and extrusion spinning on the polyvinylidene fluoride-based resin in a polymer solution including a good solvent and a pore former at a low temperature, at which the phase separation by heat does not occur, and then solidifying the resin in a non-solvent. The non-solvent induced phase separation method is advantageous in that the size of pores may be freely adjusted, but is disadvantageous in that finger-like macrovoids are included and mechanical strength of the separation membrane is reduced, thereby shortening the service life of the membrane.

Meanwhile, a heat-induced phase separation method is a method in which a separation membrane is prepared by using a polyvinylidene fluoride-based resin and a latent solvent, spinning the polyvinylidene fluoride-based resin at a temperature at which the phase separation by heat occurs, and cooling and solidifying the resin, and it is general to exhibit a spherical structure by crystals of a polymer, particularly, spherulite. The heat-induced phase separation method is advantageous in that a separation membrane, which is mechanically strong, is easily prepared, but it is difficult to reduce the pore size to the ultrafiltration membrane size.

A separation membrane by the non-solvent or heat-induced phase separation method has been prepared by using an apparatus in the form of a reactor equipped with a stirrer to dissolve a solvent and additives, removing bubbles, and then performing extrusion under a pressure of nitrogen or a gear pump, but the method is disadvantageous in that it requires a lot of time to dissolve the polymer and stabilize the removal of bubbles, and it is difficult to manage the process, such that it is difficult to spin a highly viscous polymer solution, and when spinning is performed by increasing the temperature of the solution, the temperature of the tubing connected to the nozzle needs to be adjusted, and the like.

Recently, attempts have been made to prepare a separation membrane using an extruder so as to compensate for the disadvantage and enable a continuous process. However, as a disadvantage, temperature needs to be increased to a melting point of the polymer or more in order to dissolve the polymer pellet or the powder, and it is difficult to control the heat-induced phase separation generated by heat during the process in which the polymer solution is cooled to room temperature. When a spherical structure is exhibited in this case as described above, it is difficult to decrease the size of pores.

Therefore, there is a need for a method of preparing a separation membrane having a pore size in a range of a ultrafiltration membrane, which may be applied to water purification, process water, reuse, and sewage and wastewater treatment while performing a continuous spinning process using an extruder.

Meanwhile, in the case of a polyvinylidene fluoride-based separation membrane generally prepared, the surface is hydrophobic and has a characteristic vulnerable to contamination, and as a general hydrophilic modification method for preventing this problem, methods of mixing a hydrophilic polymer during the preparation of a polymer solution, or performing surface modification or coating in a post-treatment process, and the like have been frequently used. However, the former has good productivity, but it is difficult to have a uniform distribution because most of the hydrophilic polymers have low compatibility with polyvinylidene fluoride, and the latter has a problem with uniformity and durability of the surface. Therefore, there is a need for consideration on a method which may maintain durability along with uniformity, and enables a continuous process.

Throughout the present specification, a plurality of papers and patent documents are referenced, and citations thereof are indicated. The disclosure of each of the cited papers and patent documents is incorporated herein by reference in its entirety to describe the level of the technical field to which the present invention pertains and the content of the present invention more apparently.

DISCLOSURE OF THE INVENTION

Technical Problem

The present inventors have tried to develop a hollow fiber membrane having a novel structure, which is excellent in mechanical strength, water permeability and resistance to membrane contamination, and simultaneously includes ultrafiltration membrane performance which may remove even viruses. As a result, the present inventors have succeeded in preparing a high-performance ultrafiltration membrane having a novel structure in which micropores are formed on the outermost surface by adding a specific good solvent or poor solvent-based additive to effectively control a sponge structure while using a continuous process method without using a conventional extrusion apparatus in the form of a stirrer, thereby completing the present invention.

Technical Solution

Therefore, an object of the present invention is to provide a hollow fiber membrane having the novel structure, which shows a ultrafiltration membrane performance.

Another object of the present invention is to provide a method of preparing a hollow fiber membrane having the novel structure, which shows a ultrafiltration membrane performance.

The other objects and advantages of the present invention will be more apparent from the following detailed description, claims and drawings of the invention.

To achieve these and other advantages and in accordance with the purpose of the present invention, as embodied and broadly described herein, there is provided a hollow fiber membrane in which (i) a dense sponge structure having pores with a size of 0.001 to 0.05 µm, (ii) a finger-like sponge structure, and (iii) a sponge-bead mixed structure are formed in the order numbered from the outermost surface.

Since the non-solvent induction is predominant on the separation membrane surface portion by using an extruder such that a separation membrane may be prepared by a continuous process without using a conventional extrusion apparatus in the form of a stirrer, and then using a low-molecular liquid additive as well as a specific good solvent-poor solvent-based additive and an aqueous polymer to minimize formation of a spherical structure by spherulite, which is a typical result of the heat-induced phase separation in a separation membrane cross-sectional structure, the present inventors may obtain a pore size in a range of a ultrafiltration membrane having a very dense sponge structure on the outermost surface, and may provide excellent mechanical strength while reducing the flow resistance because a part of the spherical structure is together formed in the sponge inside thereof.

Further, in order to obtain an inherent sponge structure of the present invention, the present inventors have controlled the sponge structure by adding a specific good solvent or poor solvent-based additive to water which constitutes a coagulation bath, and may successfully prepare a hollow fiber membrane having the novel structure of the present invention, which shows a ultrafiltration membrane performance without using a conventional extrusion apparatus in the form of a stirrer.

The hollow fiber membrane of the present invention is characterized to be excellent in mechanical strength and water permeability, and simultaneously have high performance which may remove even viruses, and essentially includes an inherent 3-stage structure in order to achieve the objects and effects of the present invention.

When specifically observed, (i) the dense sponge structure formed on the outermost surface is very dense and simultaneously has micropores with a size of 0.001 to 0.05 µm, preferably 0.001 to 0.02 µm, and thus imparts high performance in the level of a ultrafiltration membrane which may remove even viruses to the hollow fiber membrane.

The dense sponge structure which serves such as role may be formed to have a thickness of 0.01 µm to 50 µm, preferably a thickness of 0.01 µm to 20 µm, in the hollow fiber membrane of the present invention.

Next, (ii) the finger-like sponge provides the hollow fiber membrane of the present invention with macrovoids to reduce the flow resistance and increase the permeation flow rate, and as a result, serves to impart excellent water permeability characteristics.

In an exemplary embodiment, the finger-like sponge structure may be formed to have a thickness of 10 µm to 150 µm, preferably a thickness of 10 µm to 100 µm.

In the hollow fiber membrane of the present invention, the finger-like sponge structure is formed to have a thickness much greater than that of the dense sponge structure formed on the uppermost surface, and for example, the thickness of the finger-like sponge structure may be about 5 times to 10,000 times greater than the that of the dense sponge structure, and such a structure reduces the flow resistance to help the permeation flow rate to be increased.

As described above, since the dense sponge structure on the outermost surface includes a small thickness, and the finger-like sponge structure subsequently formed includes a large thickness, the hollow fiber membrane of the present invention is advantageous in that it is also possible to secure excellent water permeability simultaneously while exhibiting high performance of removing even viruses.

(iii) The sponge-bead mixed structure subsequently formed forms a structure in which beads are embedded in a 3-D network having a sponge shape formed as a whole, and thus serves to provide high mechanical strength as well as excellent water permeability performance.

According to an exemplary embodiment, the sponge-bead mixed structure may have a thickness of 50 µm to 350 µm, preferably 50 µm to 200 µm.

When water permeates from outside to inside of the hollow fiber membrane, the dense sponge layer in the three-structure arrangement forms the outermost portion, and the sequence of the finger-like sponge structure and the sponge-bead mixed structure may not be interchanged. From the viewpoint of preparing the hollow fiber membrane, the non-solvent induced phase separation needs to be predominant even in the inside thereof in order to have a finger-sponge structure in the inner surface with which the inner coagulation solution is in contact, and in this case, it is highly likely that a dense layer is formed even in the inner surface, thereby increasing the flow resistance. Meanwhile, even from the viewpoint of flow resistance and mechanical strength, it is advantageous in reducing resistance to dispose a finger-like sponge structure which has a short flow path subsequently to a dense layer having a thin thickness, which serves for filtration, and to dispose a sponge-bead mixed structure which serves for mechanical strength and may further decrease the flow resistance by increasing the pores or the pore density particularly on the surface of the inner coagulation solution.

When one of the three-layer structure is absent, or the sequence thereof is changed, the object and effect of the present invention as described above may not be achieved, and the hollow fiber membrane of the present invention includes an inherent triple structure, thereby being excellent in mechanical strength and water permeability and exhibiting a synergistic effect of having high performance which may remove even viruses.

In an exemplary embodiment, the hollow fiber membrane of the present invention is characterized in that the density of the bead structure is reduced as (iii) the sponge-bead mixed structure goes from the central portion to the inner coagulation solution, of the hollow fiber membrane.

In another exemplary embodiment, the hollow fiber membrane is a polyvinylidene fluoride (PVDF)-based ultrafiltration membrane including a polyvinylidene fluoride resin as a first polymer, and may additionally include a second polymer and a third polymer in addition to the first polymer polyvinylidene fluoride resin, in order to secure hydrophilic modification characteristics and other characteristics.

Here, the hydrophilic polymer refers to a polymer having a polar or charged functional group so as to have compatibility with water, and as the first polymer and the third polymer, it is possible to use polyvinylpyrrolidone (PVP), polyethylene glycol (PEG), an acrylamide resin, other acrylic resins, an amine-based resin such as allylamine, ethyleneimine, and oxazoline, and the like, and the polymers are not limited thereto.

In a preferred exemplary embodiment, as the second polymer and the third polymer for imparting hydrophilicity, polyvinylpyrrolidone (PVP) and polyethylene glycol (PEG) may be respectively used.

In another exemplary embodiment, the polyvinylidene fluoride (PVDF) may have a weight average molecular weight of 250,000 to 400,000, and it is possible to use polyvinylpyrrolidone (PVP) having an average molecular weight of 6,000 to 80,000 and polyethylene glycol having an average molecular weight of 200 to 600.

Another aspect of the present invention provides a method of preparing the hollow fiber membrane in a continuous process, the method including: (i) supplying a polyvinylidene fluoride (PVDF)-based resin to an extruder, (ii) supplying a good solvent and a poor solvent to the extruder, (iii) mixing the supplied materials by using a screw in a cylinder of the extruder, and (iv) extruding and spinning the mixed solution.

According to an exemplary embodiment of the present invention, when the polyvinylidene fluoride (PVDF)-based resin as the first polymer is supplied to the extruder in step (i), both the second polymer and the third polymer may also supplied to the extruder for the purpose of hydrophilic modification, imparting porosity and strength, and the like.

Here, when a polymer other than the first polymer polyvinylidene-based resin (PVDF) is mixed therewith, the polyvinylidene-based resin (PVDF) may be used in an amount of 20 to 40 wt %, more specifically 20 to 35 wt % in the entire polymer composition, and when the content of the PVDF resin is less than 20 wt %, the strength of the hollow fiber membrane may be weak, and when the content is more than 40 wt %, the concentration of the polymer solution is so high that there may be a problem in that it is difficult to form a hollow fiber separation membrane having a small pore size.

In another exemplary embodiment, the second polymer and the third polymer to be additionally included may be included in a content of 20 to 60 wt %, more specifically, 30 to 50 wt %, respectively, based on the weight of the first polymer.

Here, if the second polymer and the third polymer to be additionally included are a hydrophilic polymer used for forming pores, there may be a problem in that when the content is less than 20 wt %, the porosity of the separation membrane may be too low, and when the content is 60 wt % or more, the porosity becomes so high that the strength becomes weak.

In a preferred exemplary embodiment, the method of the present invention may supply both polyvinylpyrrolidone (PVP) and polyethylene glycol (PEG) as a second polymer and a third polymer, respectively to an extruder in order to impart hydrophilicity when the polyvinylidene fluoride (PVDF)-based resin in step (i) is supplied as a first polymer to the extruder, and in this case, the polyvinylidene-based resin (PVDF) may be included in an amount of 20 to 40 wt % based on the total weight of the polymer solution, and the second polymer and the third polymer polyvinylpyrrolidone (PVP) and polyethylene glycol (PEG) may be included in an amount of 20 to 50 wt %, respectively based on the weight of the first polymer.

In a preferred exemplary embodiment, the polyvinylidene fluoride fluoride (PVDF) and polyvinyl pyrrolidone (PVP) may be put into a dehumidifier at a drying temperature of 40 to 90° C. and dried before being supplied to the extruder.

Here, the dried polyvinylidene fluoride-based resin may be supplied together to the hopper of the extruder when the polyvinylidene fluoride (PVDF)-based resin is supplied to the extruder, and the polyvinylpyrrolidone may be dissolved in a predetermined amount in a good solvent, for example, N-methyl-2-pyrrolidone, and then supplied in a mixture with a poor solvent through a liquid supply pump connected to the cylinder of the extruder. Meanwhile, when polyvinylpyrrolidone is not supplied through a liquid pump, polyvinylpyrrolidone may be mixed with a polyvinylidene-based resin and dried, and then may also be supplied through an extruder hopper.

In the method of the present invention, step (ii) is a step of supplying the good solvent and the poor solvent to the extruder, and these solvents may be supplied through a liquid pump.

In an exemplary embodiment, as the good solvent, it is possible to use dimethylformamide (DMF), n-methyl-2-pyrrolidone (NMP), dimethylacetamide (DMAc), dimethyl sulfoxide (DMSO), triethyl phosphate (TEP) and the like, and as the poor solvent, it is possible to use ethylene glycol (EG), propylene glycol, diethyelene glycol (DEG), triethylene glycol (TEF), dipropylene glycol (DPG), glycerol, maleic anhydride, propylene-1,2-carbonate (PC), and the like, but these solvents are not limited thereto.

In another exemplary embodiment, the poor solvent may be included in an amount of 30 to 70 wt % based on the weight of the good solvent, and when the ratio of the poor solvent is less than 30 wt %, the solubility characteristics of a solvent composed of the phase separation good solvent-poor solvent are improved, so that it may be difficult to form a basal nucleus, and as a result, when a spherical structure is formed, the spherical structure is increased, so that a tendency to prepare a separation membrane having large pores may be increased. When the ratio of the poor solvent is 70% or more, solubility characteristics of the solvent becomes so decreased that it may be difficult to prepare a separation membrane.

In a preferred exemplary embodiment, as the good solvent, N-methyl-2-pyrrolidone (NMP) may be used, and as the poor solvent, diethyelene glycol may be used, and in this case, the content and weight percentage of each component included may be as follows.

| | |
|---|---|
| First polymer (P1): Polyvinylidene-based resin (PVDF) | 20 to 40 wt % |
| Second polymer (P2): Polyvinylpyrrolidone (PVP) | 5 to 15 wt % |
| Third polymer (P3): Polyethylene glycol (PEG) | 5 to 15 wt % |
| Good solvent: N-methyl-2-pyrrolidone (NMP) | 25 to 45 wt % |
| Poor solvent: Diethylene glycol (DEG) | 12 to 22 wt % |

In still another exemplary embodiment, in the method of the present invention, a nucleating agent may be added to the first and second mixed solvents for control of the spherical structure, and in this case, the amount of the nucleating agent added may be less than 0.2 wt %, specifically, less than 0.15 wt %, based on the weight of the first polymer polyvinylidene fluoride-based resin.

An available nucleating agent may vary according to the crystal temperature, but includes adipic acid, salicylic acid, benzoic acid, monochloroacetic acid, citric acid, stearic acid, oleic acid, oxalic acid and the like, and the nucleating agent is not limited thereto.

In yet another exemplary embodiment, in order to prepare the PVDF hollow fiber separation membrane of the present invention, a polyvinylidene fluoride (PVDF)-based resin as a first polymer resin, polyvinylpyrrolidone (PVP) as a hydrophilic polymer (a second polymer resin), N-methyl-2-pyrrolidone (NMP) as a good solvent, diethyelene glycol as a poor solvent, and adipic acid as a nucleating agent may be together used, and when hydrophilic modification characteristics are additionally imparted, both azobis acrylonitrile (AIBN) as a photoinitiator and methyl methacrylate as a photocuring agent may also supplied by a liquid pump.

In the method of the present invention, step (iii) is a step of mixing the supplied materials by using a screw in a cylinder of the extruder. This is a step of mixing raw materials for a membrane preparation polymer solution, and all the mixing process is performed in a screw of a cylinder of the extruder. A uniaxial extruder may also be used, but it is preferred that a biaxial extruder is used in order to increase the mixing efficiency.

In an exemplary embodiment, the extruder may be composed of 10 cylinders, and the temperature for each cylinder may be adjusted, and here, each temperature may be adjusted within 50 to 250° C.

In another exemplary embodiment, the polyvinylidene fluoride-based resin used as the first polymer and the second polymer power such as polyvinylpyrrolidone may be supplied through a hopper, and the other solvents, the nucleating agent, and the third polymer such as polyethylene glycol (PEG) may be supplied through a cylinder adjacent to the hopper through the liquid supply pump.

Preferably, the configuration of the segment of the screw may be optimized in order to increase the mixing efficiency, and for example, the rotation speed of the screw may be adjusted to 150 to 300 rpm. In this case, the supplied materials are simultaneously molten while being mixed by the temperature of the cylinder and the rotation of the screw.

In the method of the present invention, step (iv) is a step of extruding and spinning the mixed solution, and the polymer solution mixed and molted by the temperature of the cylinder and the rotation of the screw was extruded and transferred to a gear pump, and then the polymer solution may be extruded and spun through a nozzle by a metered gear pump.

Here, preferably, the mixed solution may be spun with an inner coagulation solution.

The method of the present invention may additionally include cooling and solidifying the solution spun from (iv) through a coagulation bath.

As the inner coagulation solution and the coagulation bath, it is possible to use a good solvent, or a poor solvent or a good solvent in mixture with water, and in this case, as the poor solvent and the good solvent, the aforementioned solvents may be used.

The temperature of the inner coagulation solution and the phase transition bath may be set to preferably 0 to 80° C., more preferably 10 to 50° C. There may be a problem in that when the temperature of the inner coagulation solution and the phase transition bath is 10° C. or less, extremely fast solidification occurs on the surface of the hollow fiber separation membrane because rapid cooling proceeds, and it is difficult to impart the porosity of the hollow fiber separation membrane, and when the temperature is more than 80° C., the solidification occurs extremely slow and polymer crystals become large, and accordingly, the size of the pores is increased, and mechanical strength becomes weak.

In a preferred exemplary embodiment of the present invention, a drawing machine may be used as a method of increasing mechanical strength of the hollow fiber separation membrane and enhancing the pure water permeation flow rate thereof, and for example, a wet heat drawing machine and a dry heat drawing machine may be installed to control the rotation speed of a roll. In the case of the wet heat drawing machine, water or vapor may be used, and it is preferred that the temperature may be maintained at 80 to 90° C. In addition, drawing ratio is preferably set to one time to five times.

In another exemplary embodiment of the present invention, for example, a hydrophilic modification process may be added to the continuous process prior to a step of cooling and solidifying the solution spun from step (iv) through a coagulation bath.

In this case, by adding a process of subjecting the polymer solution extruded and spun to UV irradiation, allowing the polymer solution to pass through a washing bath before entering the coagulation bath, and removing the coagulation bath solution on the surface of the membrane through an air knife before the polymer solution enters a washing bath, the optical curable material present in the polymer solution is photocured, and the hydrophilic polymer network may be present in the polyvinylidene fluoride-based separation membrane, thereby having hydrophilic characteristics on the surface as well as in the inside thereof.

The thus cooled and solidified polyvinylidene fluoride-based separation membrane through the coagulation bath passes through the washing bath to melt the used solvent-based or unreacted photocuring agent, a photoinitiator or a hydrophilic polymer additive and the like, and here, the porosity may be adjusted by using a solvent to melt a portion of the photocured material, if necessary.

Finally, a drying process may be preferably added to prepare a solidified polyvinylidene fluoride-based separation membrane.

EFFECT OF INVENTION

The hollow fiber separation membrane of the present invention has a dense sponge structure, a finger-like sponge structure, and a sponge-bead mixed structure in sequence from the outermost surface while having an outermost surface pore size of 0.001 to 0.03 μm and an average pore size of 0.01 to 0.1 μm, and includes high performance which is all excellent in mechanical strength, porosity, and water permeability, and simultaneously may remove even viruses due to the inherent triple structure thereof.

BRIEF DESCRIPTION OF THE DRAWINGS

FIG. 2. Scanning Electron Microscope photographs of the separation membrane prepared in Example 2

FIG. 4. Scanning Electron Microscope photographs of the separation membrane prepared in Example 4

BEST MODES FOR CARRYING OUT INVENTION

Figure 1A:
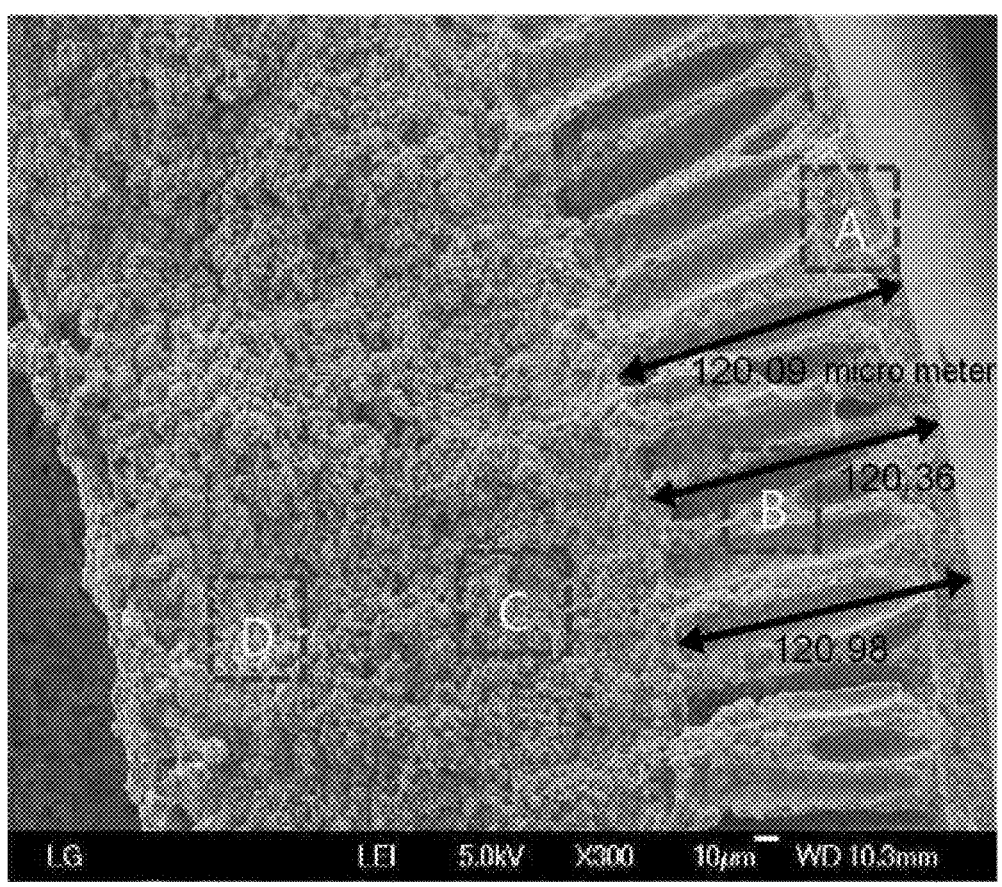
FIG. 1a illustrates a cross-section of the separation membrane prepared.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

EXAMPLE

Example 1

A mixture ratio was set to 27 wt % of a polyvinylidene fluoride-based resin PVDF (solvay Co., Ltd. 6010 grade, molecular weight 322 kDa), 37 wt % of N-methyl-2-pyrrolidone (NMP), 18 wt % of diethyelene glycol (DEG), 9 wt % of polyvinylpyrrolidone (PVP K30), and 9 wt % of polyethylene glycol (PEG 200), the polyvinylidene-based resin was supplied to a hopper of an extruder, and NMP, DEG, PEG, and PVP K30 were supplied to a cylinder of the extruder through a liquid supply pump. As the temperature of extruder Regions 0 to 9 (C0 to C9), Regions C0 to C3, C4, C5 to C7, C8, and C9 were adjusted to 50° C., 120° C., 170° C., 150° C., and 120° C., respectively, and the temperature from the regions to the nozzle part was set to 120° C.

The screw rotation speed was set to 300 revolution/min, the materials mixed in the cylinder of the extruder were molten and extruded in a biaxial extruder, and then finally spun through a gear pump and a nozzle, and entered a coagulation bath. The outer diameter and inner diameter of the nozzle was each 2.0 mm and 1.2 mm, the distance between the nozzle and the coagulation bath was 50 mm, and a mixture (NMP:ethylene glycol (EG)=7:3) was used as an inner coagulation solution.

As the composition of the coagulation bath solution, pure water (deionized waer, DI) in which ions had been removed was used, and the temperature of the coagulation solution was 20° C. The ultrafiltration product of the present invention was prepared by extracting the separation membrane passing through the coagulation bath from the washing bath one day or more, and then drying the separation membrane at room temperature.

Physical properties of the separation membrane prepared by the method were measured and are shown in the following Table 1, and as a result of the experiment, the separation membrane prepared in Example 1 had a tensile strength of 2.5 Mpa and an elongation of 20%, which is excellent in mechanical strength, and for the average pore size of the hollow fiber membrane, a pore size of 0.01 μm was inferred by using a molecular weight cut off (MWCO) method to obtain 100% of the PEO 100,000 removal, and it can be confirmed that the hollow fiber membrane was a ultrafiltration membrane having a pure water permeation flow rate of 250 L/m2 and a porosity of 59% at 1 bar and 25° C.

In order to more exactly confirm the film thickness, void size, cross-section and surface state of the hollow fiber separation membrane prepared by the method, the hollow fiber separation membrane was observed by scanning electron microscope (SEM), and the results are illustrated in FIG. 1 (FIGS. 1a to 1f).

FIG. 1a illustrates the cross-section of the separation membrane prepared, and the PVDF hollow fiber separation membrane shows an outer diameter of 1 to 1.2 mm and an inner diameter of 0.5 to 0.8 mm. The cross-sectional structure has shown that a very dense sponge structure was formed on the outermost surface, macrovoids of the finger-like sponge structure were subsequently shown, a portion of the spherical structure by spherulite was present, but minimized inside thereof, and a structure having an interpenetrating network structure as a whole was formed.

Figure 1B:
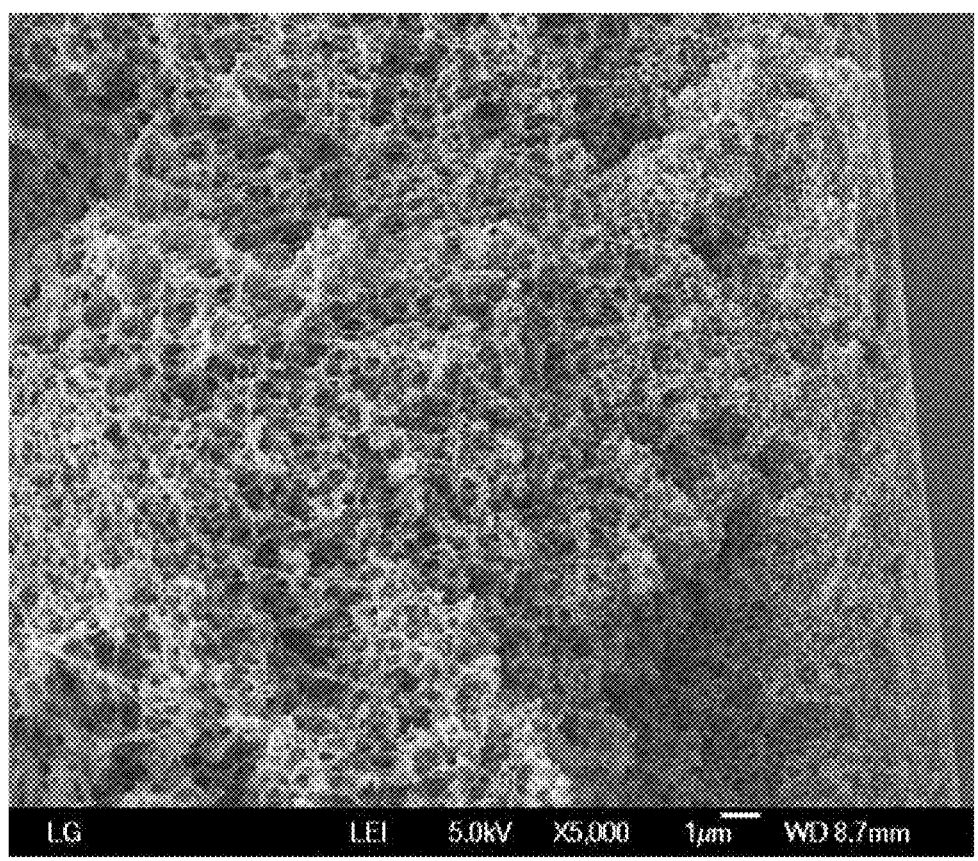
FIG. 1b magnifies a cross-section (Region A in FIG. 1a) of an outermost surface portion of the separation membrane prepared. It can be confirmed that the pores formed on the outermost surface have a size of 0.01 μm or less.

FIG. 1b further magnifies the cross-section (Region A in FIG. 1a) of the separation membrane prepared in the vicinity of the outermost surface, and it was confirmed that the outermost surface of the separation membrane had a very dense sponge structure having pores with a size of 0.01 μm or a size even smaller than the aforementioned size, and particularly, a denser structure was shown as it goes toward the surface.

The region (Region B in FIG. 1a) disposed in the inner side of the outermost surface is an interconnected finger-like sponge structure, and it was confirmed that the non-solvent induced phase separation was predominant, and the bead structure (spherulite) was rarely observed (FIG. 1a).

Figure 1C:
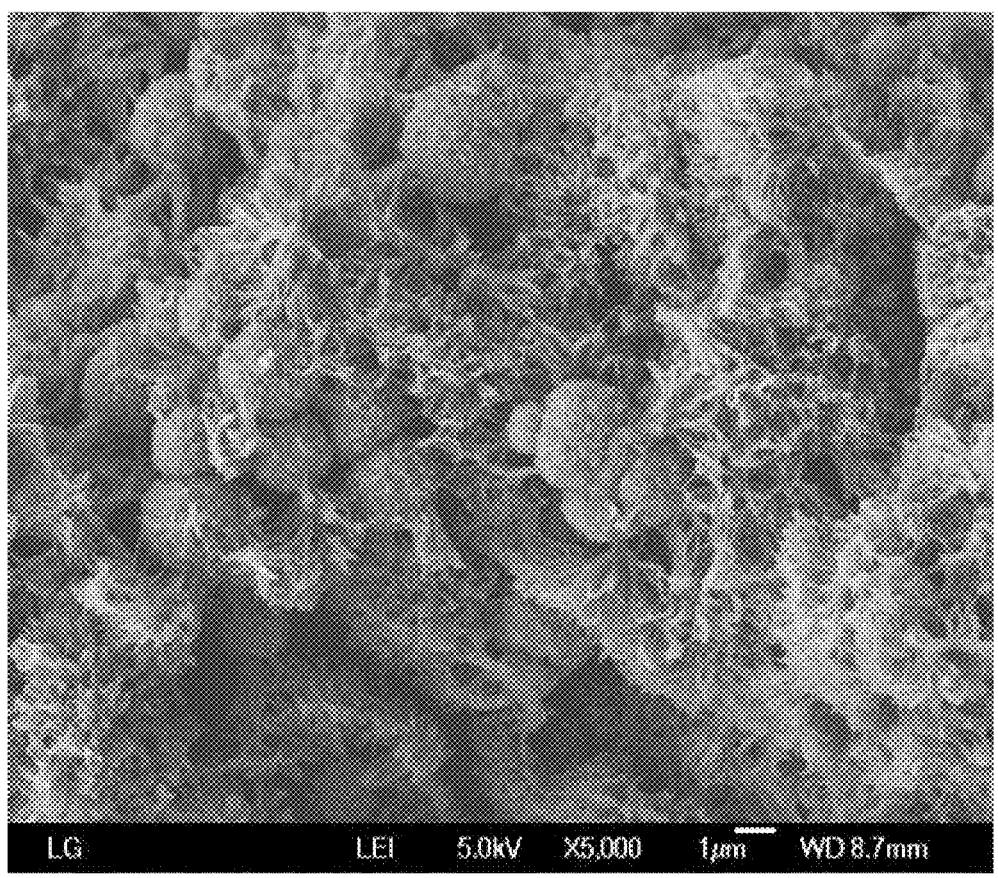
FIG. 1c is the magnification of Region C in FIG. 1a, and a structure in which sponges and spherulite are mixed is identified.
Figure 1D:
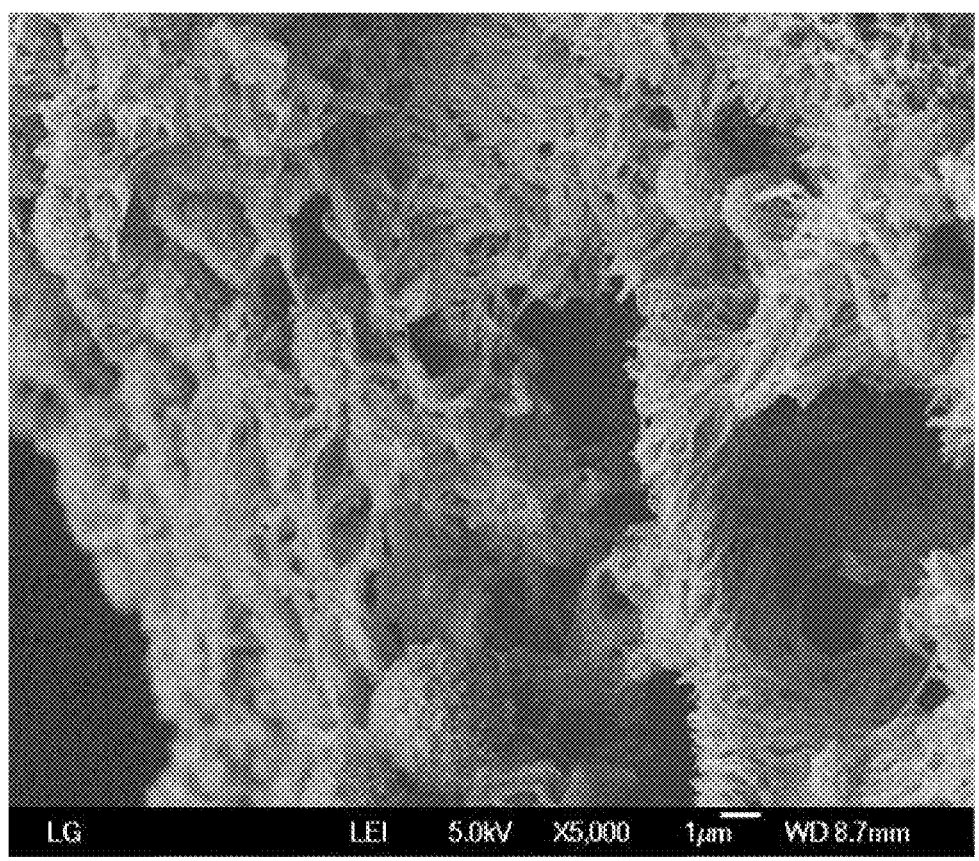
FIG. 1d is the magnification of Region D in FIG. 1a, and it can be confirmed that a structure in which sponge and beads are also mixed is formed, but the density of the bead structure is low as compared to FIG. 1c.
Figure 1E:
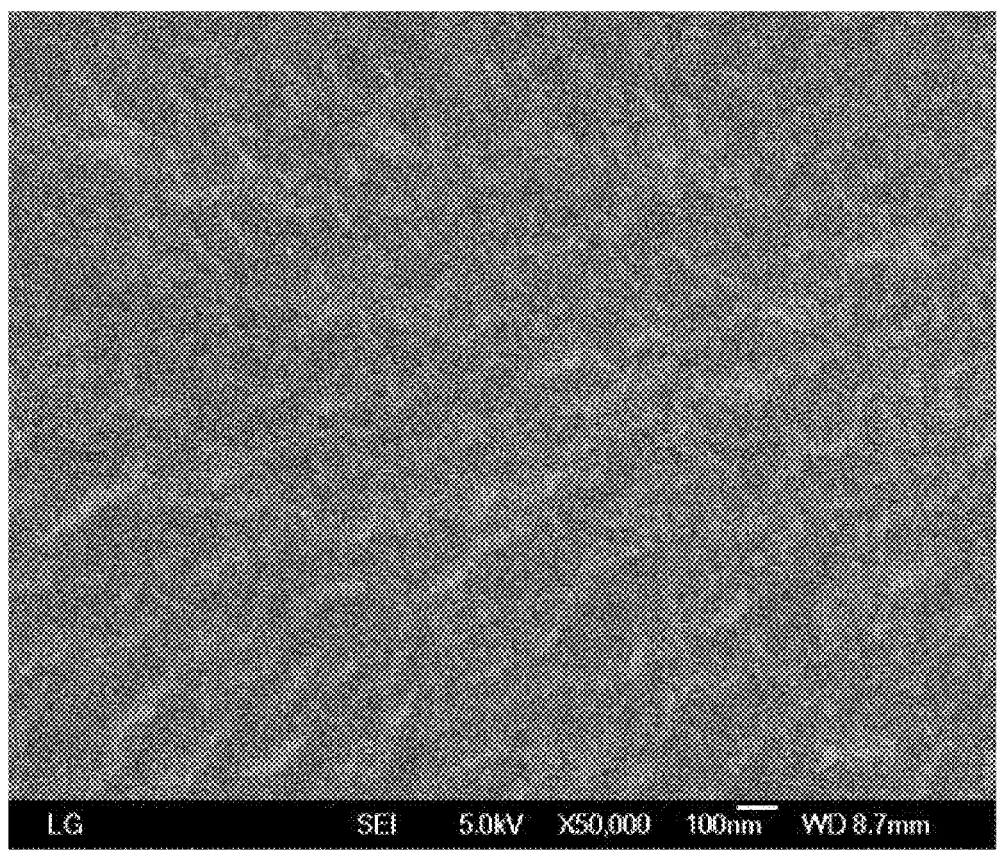
FIG. 1e is a scanning electron microscope photograph of the outermost surface of the separation membrane, and FIG. 1f further magnifies the same. The pores formed have a size of 0.01 μm or less.
Figure 1F:
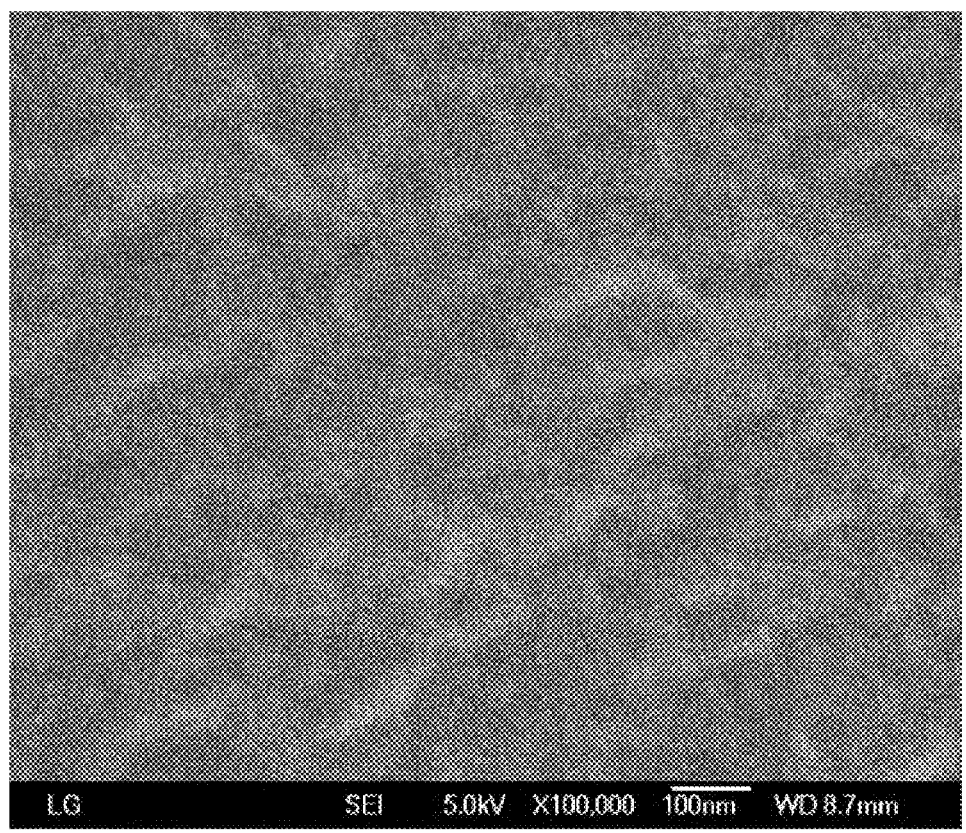
FIG. 1. Scanning Electron Microscope (SEM) photographs of the separation membrane prepared in Example 1

It was shown that the inner part (Regions C and D in FIG. 1a) of the separation membrane prepared had a structure in which sponge+beads (spherulite) were mixed, and it was because the heat-induced phase separation effects by heat were still remaining. FIG. 1c magnifies Region C in FIG. 1a, FIG. 1d magnifies Region D, Region D showed that the bead structure (spherulite) was present, but the number thereof was smaller than that in Region C, and it can be confirmed that a sponge bead mixed structure in which the density of the bead structure was smaller as it went from Region C to Region D was observed.

Example 2

Figure 2A:
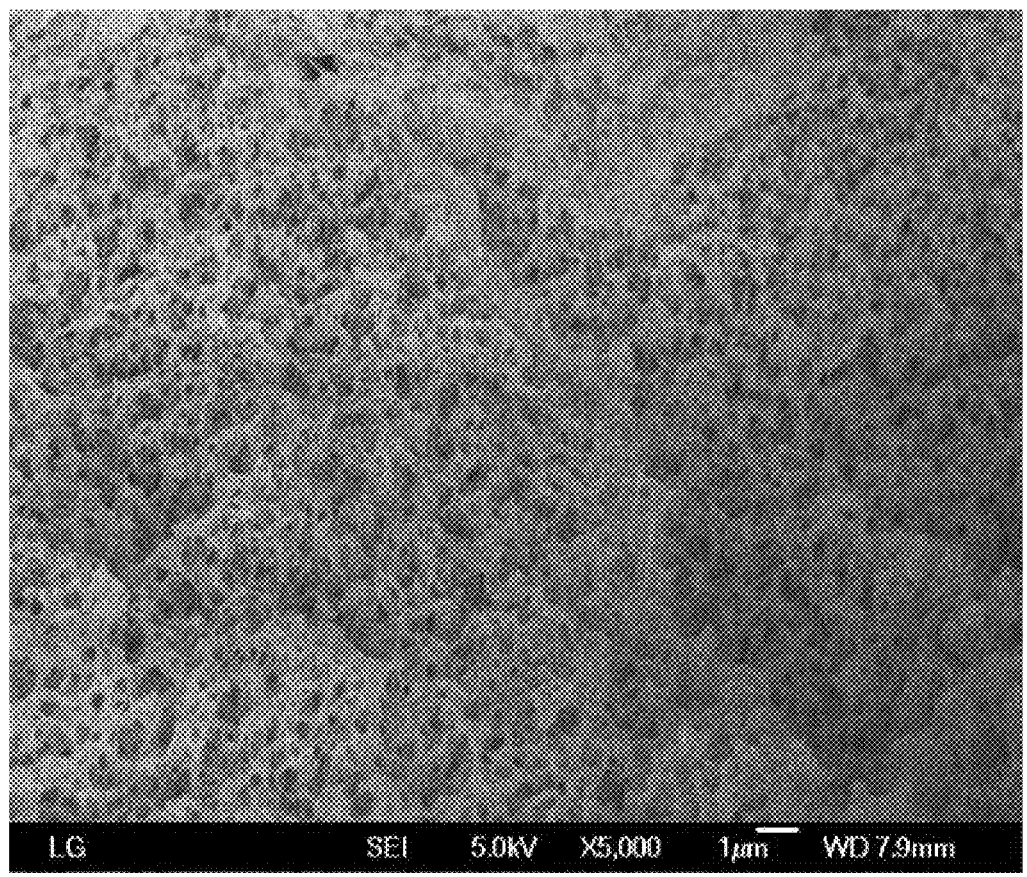
FIG. 2a illustrates a cross-section of the separation membrane prepared in the vicinity of the external surface thereof. A dense sponge structure having pores with a size of 0.01 μm is identified.

A film was formed under the same condition in the same manner as in Example 1, except that a nucleating agent adipic acid was added in an amount of 0.1 wt % based on the weight of the polyvinylidene-based resin (PVDF). Basic physical properties of the thus prepared separation membrane were measured, and are shown in the following Table 1, and the images observed by scanning electron microscope (SEM) are illustrated in FIG. 2.

Figure 2B:
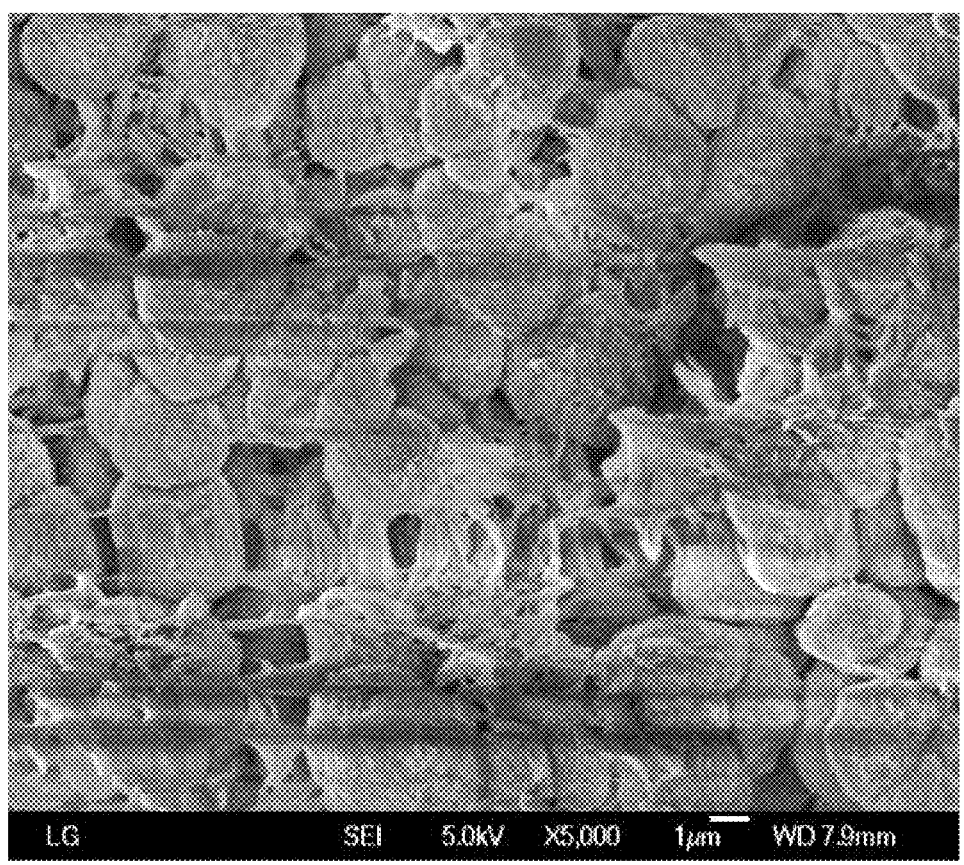
FIG. 2b illustrates an internal cross-section of the separation membrane prepared, and a structure in which sponge and beads are mixed may be identified.

As a result of observation, it was confirmed that as in the hollow fiber membrane prepared in Example 1, the outermost surface was a very dense sponge structure having pores with a size of 0.01 μm (FIG. 2a), a finger-like sponge structure was subsequently observed, and the inner part of the separation membrane was a structure in which sponge and beads are mixed (FIG. 2b).

Example 3

A separation membrane was prepared by performing the experiment in the same manner as in Example 1, using the coagulation bath solution in a mixture of water and ethanol at a ratio of 8:2, and making the other conditions the same as those of Example 1 to form a film, and the basic physical properties thereof were measured, and are shown in Table 1.

Further, the images observed by scanning electron microscope (SEM) are illustrated in FIGS. 3 (FIGS. 3a to 3f).

Figure 3A:
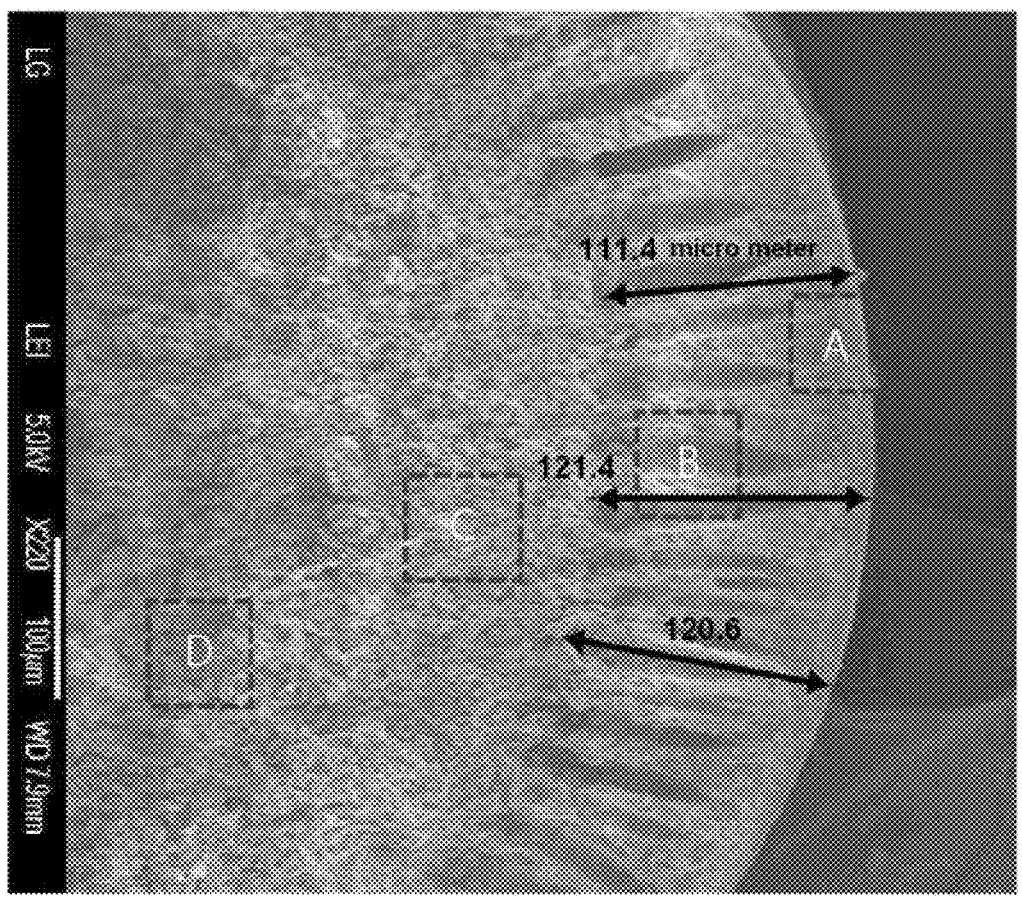
FIG. 3a illustrates a cross-section of the separation membrane prepared.
Figure 3B:
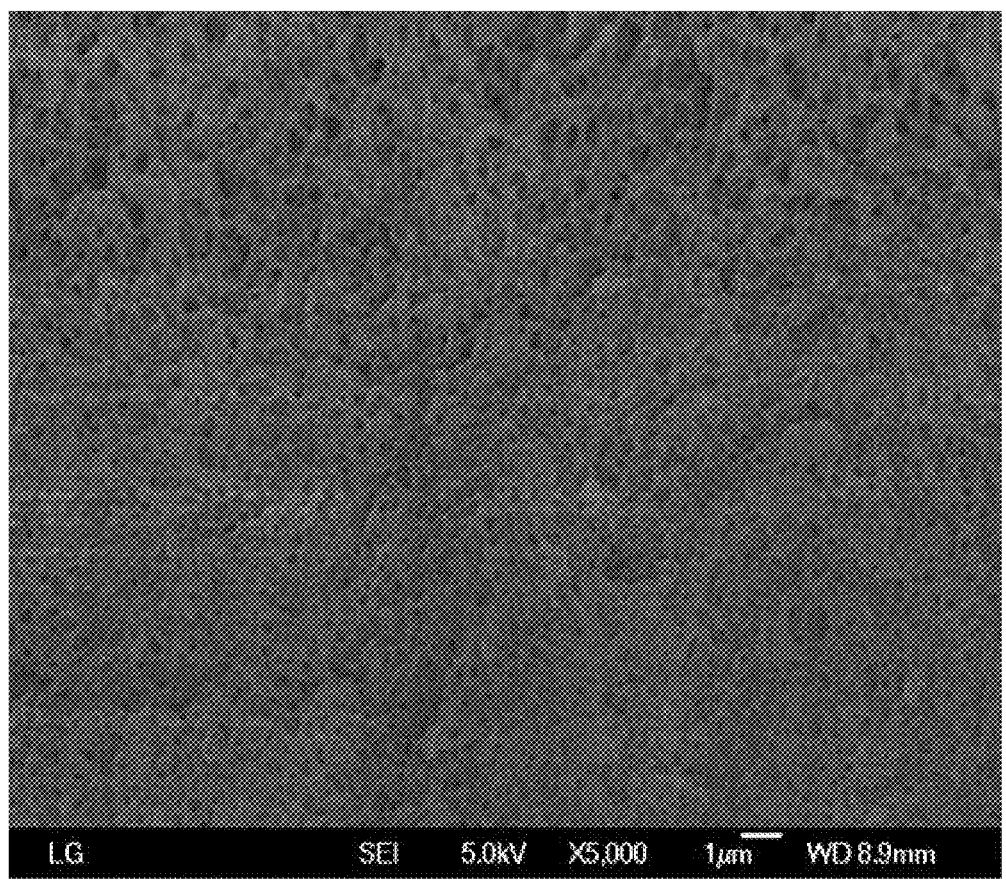
FIG. 3b magnifies a cross-section (Region A in FIG. 3a) of the separation membrane prepared in the vicinity of there outermost surface. The pores formed on the outermost surface have a size of 0.02 to 0.03 μm.
Figure 3C:
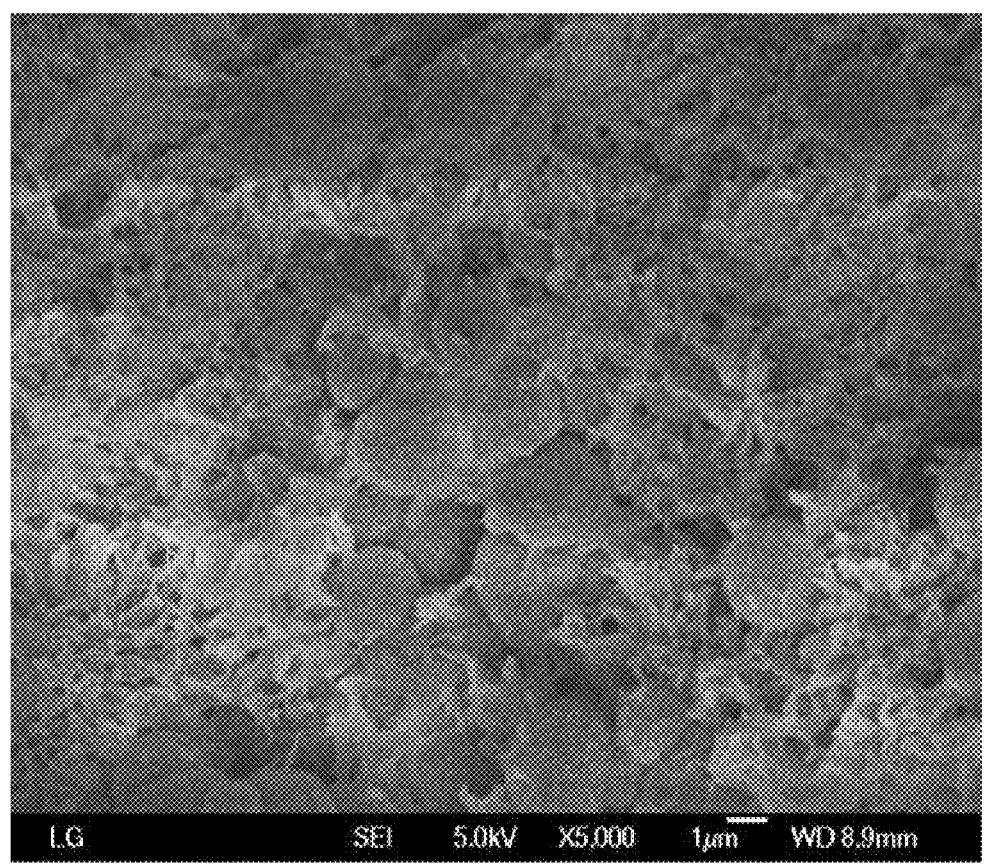
FIG. 3c magnifies Region C in FIG. 3a, which is a structure in which sponge and beads are mixed.
Figure 3D:
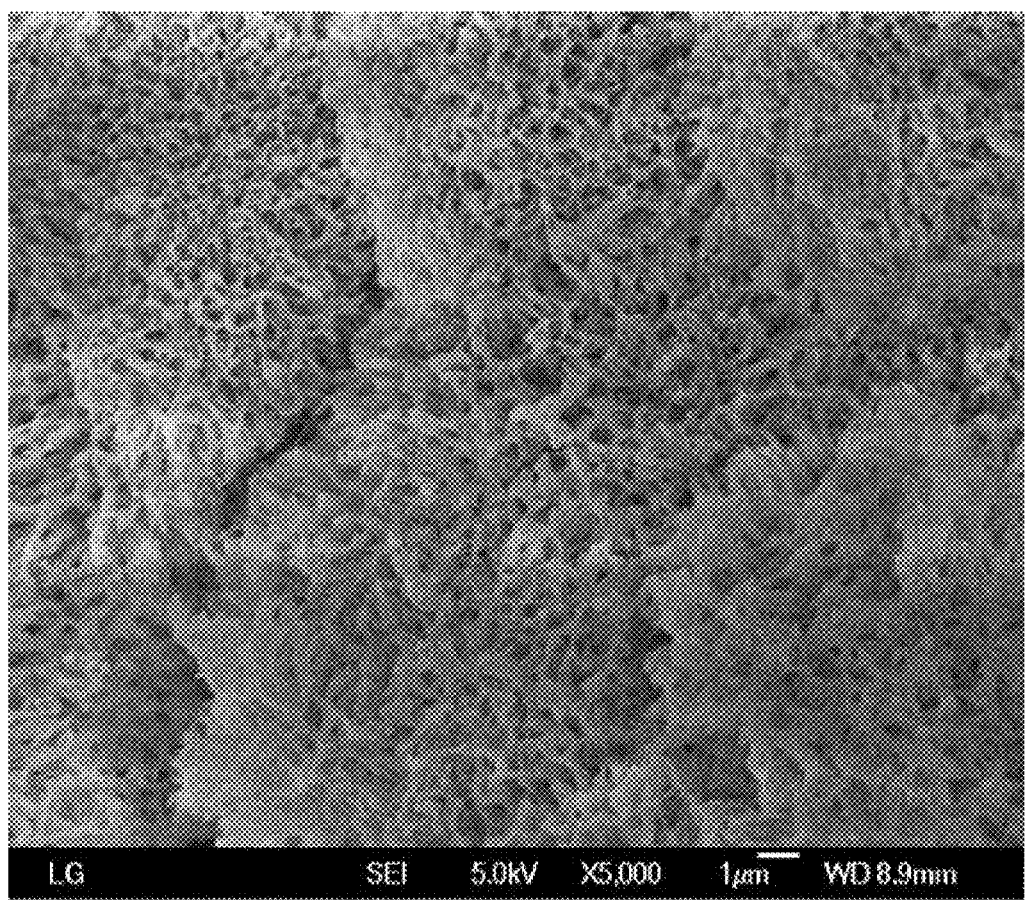
FIG. 3d is the magnification of Region D in FIG. 3a, and it can be confirmed that a structure in which sponge and beads are also mixed is formed, but the density of the bead structure is low as compared to FIG. 1c.
Figure 3E:
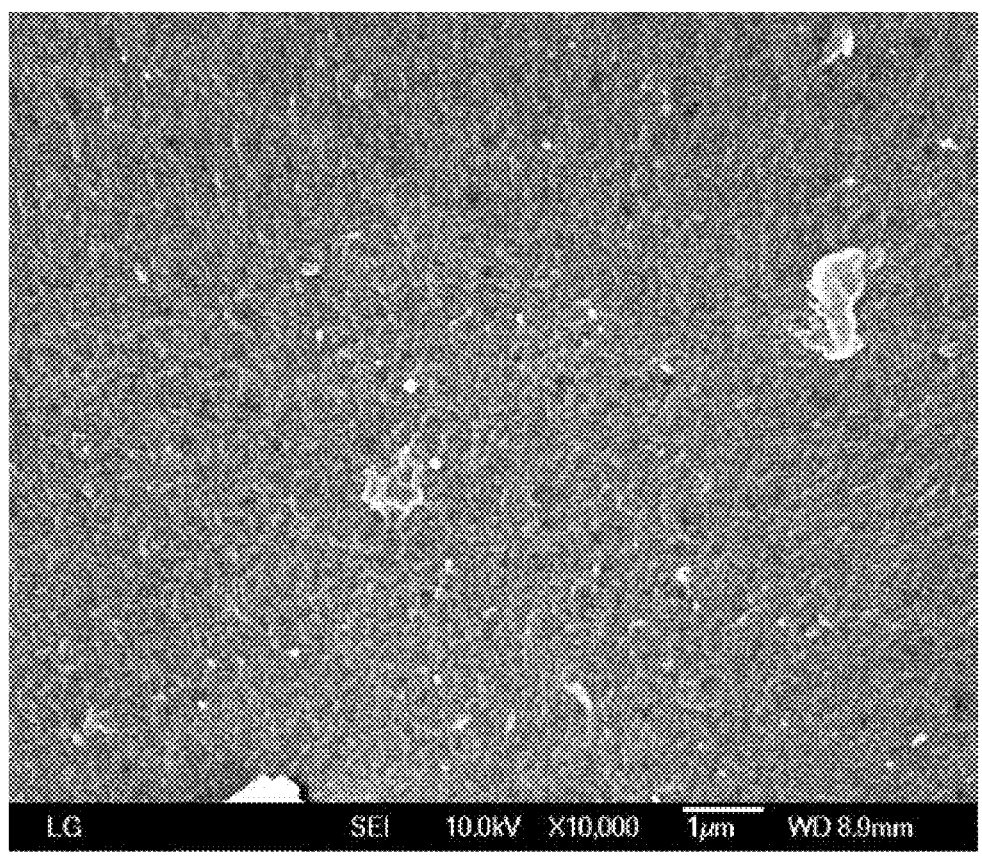
FIG. 3e observes the outermost surface of the separation membrane, and FIG. 3f further magnifies the outermost surface. The pores formed have a size of 0.02 to 0.03 μm.
Figure 3F:
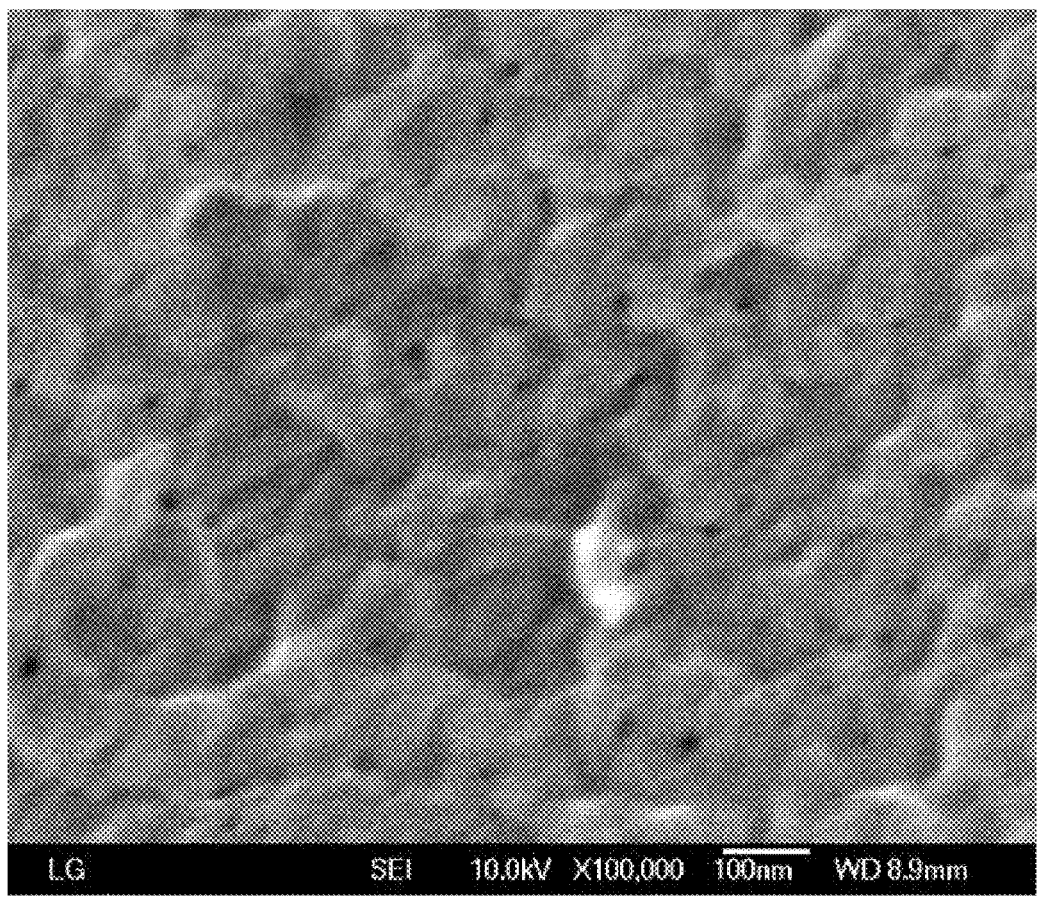
FIG. 3. Scanning Electron Microscope photographs of the separation membrane prepared in Example 3

FIG. 3a illustrates a cross-section of the separation membrane, and FIG. 3b magnifies a cross-section (Region A in FIG. 3a) of the separation membrane prepared in the vicinity of the outermost surface. FIGS. 3e and 3f further magnifies and observes in detail the outermost surface of the separation membrane, and as a result of observation, it was confirmed that the size of pores formed on the outermost surface was 0.02 to 0.03 μm, which is slightly larger than the size of the separation membrane prepared in Example 1 (FIGS. 3e and 3f).

Subsequent to the outermost surface, macrovoids with a finger-like sponge structure were formed, and the macrovoids became slightly smaller than in Example 1 (FIG. 3a).

It was shown that the inner part (Regions C and D in FIG. 3a) of the separation membrane prepared had a structure in which sponge+beads (spherulite) were mixed, and it was because the heat-induced phase separation effects by heat were still remaining. FIG. 3c magnifies Region C in FIG. 3a, FIG. 3d magnifies Region D, Region D showed that the bead structure (spherulite) was present, but the number thereof was smaller than that in Region C, and it can be confirmed that a sponge bead mixed structure in which the density of the bead structure was smaller as it went from Region C to Region D was observed.

Example 4

Figure 4A:
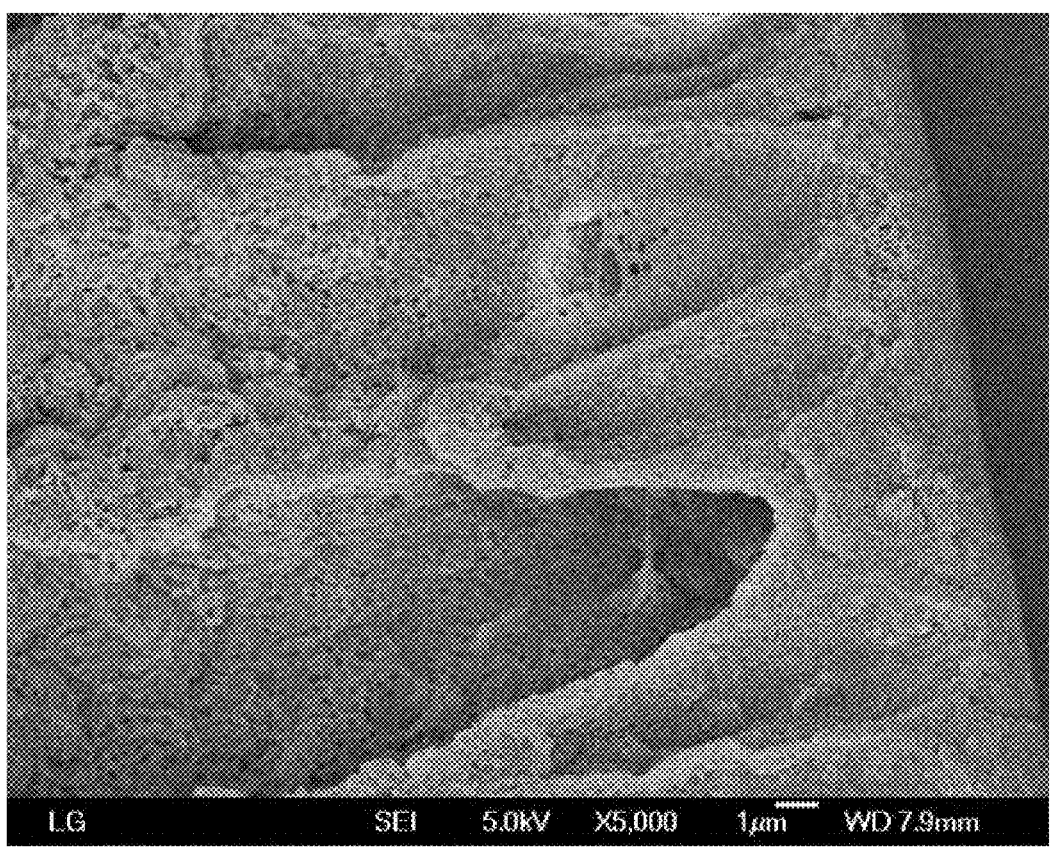
FIG. 4a illustrates a cross-section of the separation membrane prepared in the vicinity of the external surface thereof. It can be confirmed that the structure is a very dense sponge structure having pores with a size of 0.03 μm.

A film was formed by making the other conditions the same as those of Example 1 in the same manner as in Example 1, except that the poor solvent used in the polymer solution was changed from DEG to hexyl carbitol (HC). Basic physical properties of the thus prepared separation membrane were measured, and are shown in the following Table 1, and the images observed by scanning electron microscope are illustrated in FIG. 4.

Figure 4B:
FIG. 4b illustrates an internal cross-section of the separation membrane prepared, and a structure in which sponge and beads are mixed may be identified.
Figure 5:
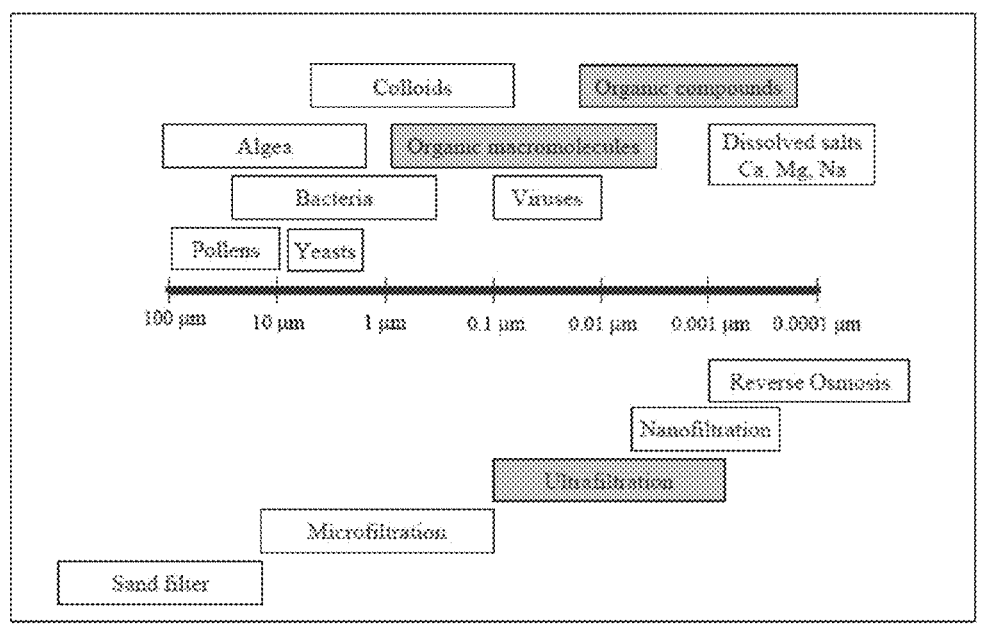
FIG. 5. compares the pore size of suspended materials including viruses with the pore size of the separation membrane.

As a result of observation, it was shown that as in the hollow fiber membrane prepared in Example 1, the outermost surface formed a very dense sponge structure having a pore size of 0.03 μm, a macrovoid structure of a finger-like sponge structure was subsequently observed (FIG. 4a), and the middle part had a structure in which sponge and beads were mixed (FIG. 4b).

Basic physical properties measured for the separation membranes prepared in Examples 1 to 4 are summarized in the following Table 1, the content of each constituent component of the present invention is not limited to the numerical value described in Table 1, and those skilled in the art can make rational summary and inference based on the numerical value range of the Table. Parameters of Table 1 are only one of the exemplary embodiments of the present invention, and should not be interpreted as an essential condition of the present invention.

TABLE 1

| | Example No. | 1 | 2 | 3 | 4 |
|---|---|---|---|---|---|
| Ratio of Polymer Solution Component | PVDF (%) | 27 | 27 | 27 | 27 |
| | PVP (%) | 9 | 9 | 9 | 9 |
| | PEG (%) | 9 | 9 | 9 | 9 |
| | NMP (%) | 37 | 37 | 37 | 37 |
| | DEG (%) | 18 | 18 | 18 | 0 |
| | HC (%) | 0 | 0 | 0 | 18 |
| Nucleating agent | Adipic acid (%, compared | 0 | 0.1 | 0 | 0 |

TABLE 1-continued

| Example No. | 1 | 2 | 3 | 4 |
|---|---|---|---|---|
| to pvdf) | | | | |
| Temperature of polymer solution (° C.) | 120 | 120 | 120 | 120 |
| Air gap (mm) | 50 | 50 | 50 | 50 |
| Constitution of Cooling Solution  Water (%) | 100 | 100 | 80 | 100 |
| Constitution of Cooling Solution  Ethanol (%) | 0 | 0 | 20 | 0 |
| Cooling temperature (° C.) | 20 | 20 | 20 | 20 |
| MWCO (PEG #100,000) (%) | 100 | 85 | 67 | 2 |
| Pure water permeation flow rate (L/m2h) | 228 | 150 | 265 | 314 |
| Tensile strength (MPa) | 2.3 | 3 | 2.4 | 3.0 |
| Pore size (μm) of outermost surface | 0.001~0.01 | 0.01 | 0.02~0.03 | 0.03 |

The invention claimed is:

1. A hollow fiber membrane in which (i) a dense sponge structure having pores with a size of 0.001 to 0.05 μm, (ii) a finger-like sponge structure, and (iii) a sponge-bead mixed structure are formed in the order numbered from the outermost surface of the membrane.

2. The hollow fiber membrane of claim 1, wherein the pores formed on the outermost surface have a size of 0.001 to 0.01 μm.

3. The hollow fiber membrane of claim 1, wherein the dense sponge structure has a thickness of 0.01 to 20 μm, the finger-like sponge structure has a thickness of 10 to 100 μm, and the sponge-bead mixed structure has a thickness of 50 to 200 μm.

4. The hollow fiber membrane of claim 1, wherein the density of the beads contained in the sponge-bead mixed structure (iii) is gradually reduced from the central part to the internal coagulant-contacting part of a membrane.

5. The hollow fiber membrane of claim 1, wherein the hollow fiber membrane is polyvinylidene fluoride (PVDF)-based membrane.

6. The hollow fiber membrane of claim 1, wherein the membrane has an ability to remove viruses.

7. A method of preparing the hollow fiber membrane of claim 1 as a continuous process, the method comprising:
   (i) supplying a polyvinylidene fluoride (PVDF)-based resin to an extruder;
   (ii) supplying a good solvent and a poor solvent to the extruder;
   (iii) mixing the supplied materials by using a screw in a cylinder of the extruder; and
   (iv) extruding and spinning out the mixed solution.

8. The method of claim 7, wherein the supplied materials are mixed and molten by screw rotation at a cylinder temperature in step (iii).

9. The method of claim 8, wherein the temperature of the cylinder is adjusted to 50 to 250° C.

10. The method of claim 8, wherein the rotation speed of the screw is adjusted to 150 to 300 rpm.

11. The method of claim 7, wherein the mixed solution in step (iv) is spun out with an internal coagulant.

12. The method of claim 7, further comprising cooling and solidifying the solution spun out from (iv) using a coagulation bath.

* * * * *